United States Patent
Greene

[15] 3,635,630
[45] Jan. 18, 1972

[54] DENTURE MOLDING APPARATUS INCLUDING FLASK MEMBERS WITH REMOVABLE PLASTIC INSERTS

[72] Inventor: James S. Greene, 49 Gail Drive, Waterbury, Conn. 06704

[22] Filed: Apr. 28, 1970

[21] Appl. No.: 32,625

[52] U.S. Cl. ................................. 425/175, 164/376, 425/2
[51] Int. Cl. ........................................................ A61c 13/22
[58] Field of Search ..................... 18/33, 34.1; 249/54; 164/DIG. 4, 376; 264/17, 18

[56] References Cited

UNITED STATES PATENTS

| | | | |
|---|---|---|---|
| 682,098 | 9/1901 | Lyon | 164/DIG. 4 |
| 2,457,114 | 12/1948 | Amenta | 264/18 |
| 2,491,147 | 12/1949 | Zahn | 264/17 X |
| 2,712,158 | 7/1955 | Villa | 18/33 |

Primary Examiner—Robert D. Baldwin
Attorney—Erwin Koppel

[57] ABSTRACT

Apparatus and method for forming dentures wherein plastic inserts are placed within metal flask members to hold a dental mold therein. Acrylic plastic is then inserted in place of the mold to form the denture within the plastic inserts, the insert unit is then removed from the metal flask and held by plastic clamping means, and the plastic denture cured in an ultrahigh frequency oven.

5 Claims, 6 Drawing Figures

PATENTED JAN 18 1972

*INVENTOR*
James S. Greene by Erwin Koppel
ATTORNEY

DENTURE MOLDING APPARATUS INCLUDING FLASK MEMBERS WITH REMOVABLE PLASTIC INSERTS

This invention relates to the forming of dentures, and is particularly concerned with an improved apparatus thereof.

It is generally desired to form dentures of plastic, and for this result it is necessary to use heat in the process. For example, when acrylic plastic is used, a curing step is required for the polymerization of the plastic. This takes place after the acrylic plastic has been formed into the specific shape of the denture, and in the prior art this has involved placing the denture mold unit into hot water for a curing period of 2-6 hours depending upon the completeness of the curing desired. This long period of time to effect the curing is undesirable since the formation of the denture mold itself only takes a few minutes.

It is an object of the present invention to provide apparatus for forming plastic dentures in an accelerated manner.

It is another object of the present invention to provide apparatus for forming dentures from acrylic plastic wherein the curing step can be effected quickly.

It is a further object of the present invention to provide an apparatus for forming dentures from acrylic plastic including the provision of holding inserts and clamping means made of plastic material so that high-frequency rays can pass therethrough to quickly cure the denture.

It is a still further object of the present invention to provide an improved apparatus for forming dentures of acrylic plastic wherein the curing step is effected in approximately 2 minutes or less.

These and other objects will be apparent from the following description when read in connection with the drawings, in which.

Figure 1:
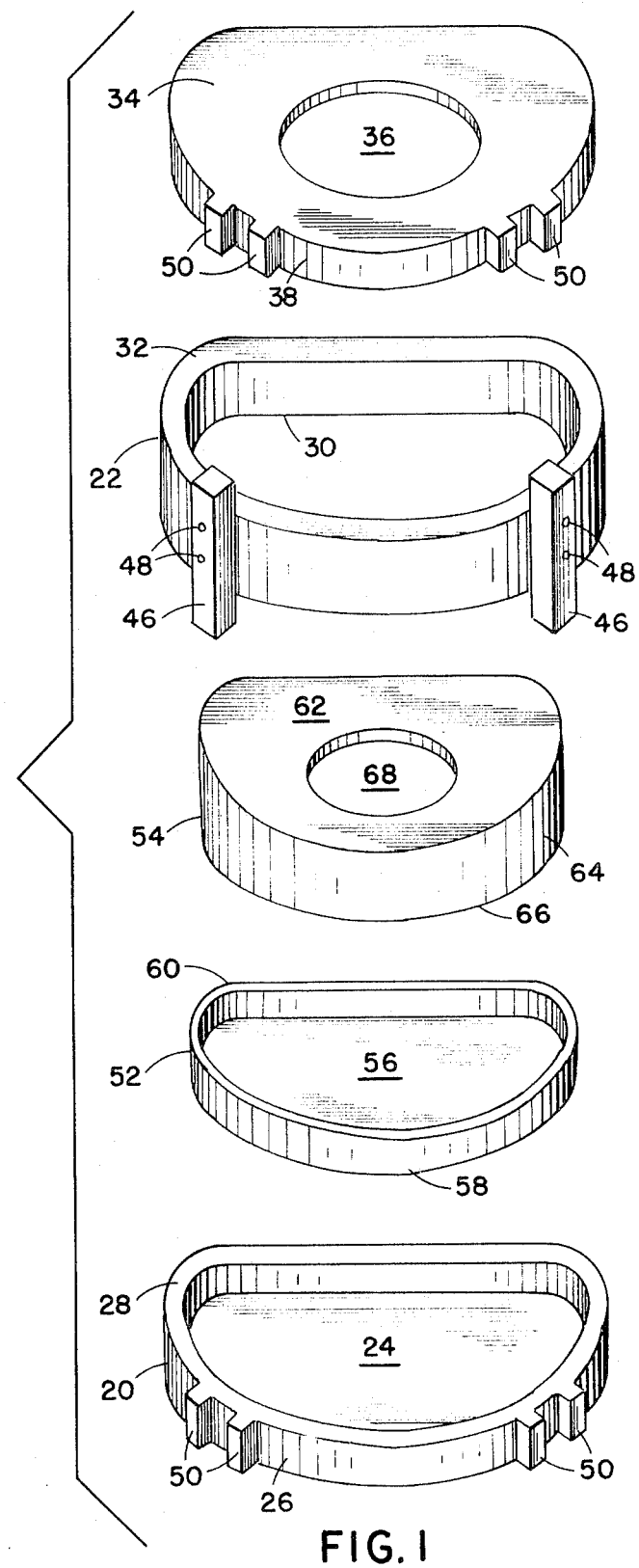
FIG. 1 is an exploded perspective view showing upper and lower flask members and plastic inserts adapted for insertion therein.
Figure 3:
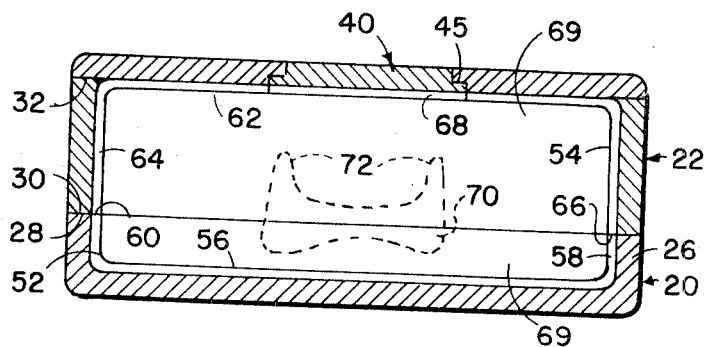
FIG. 3 is a view partly in cross section showing the flask members fitted together with a denture positioned therein.

Referring to FIGS. 1 and 3, lower flask member 20 is shown adapted to mate with upper flask member 22. Flask members 20 and 22 are thick-shelled, made of metal and generally half moon shaped in periphery. Flask member 20 has a shallow cup shape comprising an outer flat wall 24 from which extends an inner peripheral wall 26 terminating in an edge surface 28. Flask member 22 comprises a generally annular configuration which corresponds to the half moon shape of member 20. As seen in FIG. 3, the height of annular member 22 is greater than wall 26, and member 22 includes a lower edge surface 30 and an upper edge surface 32.

A top flask member 34 is adapted to fit on edge surface 32 of upper flask member 22. Top member 34 has a generally half moon shape corresponding to the outer periphery of edge surface 32, and member 34 further has a centrally located substantially circular opening 36. Member 34 has a thickness substantially the same as the thickness of annular member 22, and its outer edge is shown as side surface 38.

Figure 2:
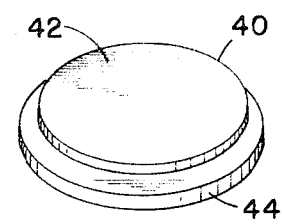
FIG. 2 is a perspective view of a plug member for the upper flask member.

A circular plug 40 is shown in FIG. 2. Plug 40 comprises a substantially circular section 42 that is adapted to loosely fit in opening 36. A further part of plug 40 comprises a stepped circular section 44 that has a diameter larger than section 42 and opening 36. Accordingly, it will be appreciated that plug 40 acts as a filler for opening 36, the section 42 entering therein from the bottom or inside of top member 34 with larger section 44 abutting a stepped surface 45 in top member 34.

The three flask members 20, 22 and 34 are brought together and held in alignment by means of lugs and projections. On upper flask member 22 are located spaced lugs 46. Each lug 46 is fastened to member 22 such as by rivets 48 and extends above and below edge surfaces 30 and 32. Pairs of projections 50 are formed on top and bottom members 20 and 34 in spaced locations corresponding to the sides of lugs 46. When the three flask members are brought together as shown in FIG. 3, the top and bottom parts of lugs 46 slide between projections 50 to insure alignment.

A novel aspect of this invention lies in the provision of plastic inserts adapted to fit within the flask members. In FIG. 1 lower plastic insert 52 and upper plastic insert 54 are shown in perspective, and in FIG. 3 the close fit within the flask members is shown. Plastic insert 52 has a shallow cup shape of half moon configuration corresponding to the inner surface shape of wall 26. Insert 52 is accordingly seen to comprise an outer surface 56 and an inner extending surface 58 terminating in an edge 60. As seen in FIG. 3 when insert 52 fits within member 20, edge 60 is flush with edge surface 28.

Plastic insert 54 also has a cup shape whose outer configuration conforms to the inner surface of annular flask member 22. Insert 54 comprises an outer surface 62 and an inner extending surface 64 terminating in an edge 66. As seen in FIG. 3 when insert 54 fits within member 22, edge 66 is flush with edge surface 30. Surface 62 includes a centrally located circular opening 68 for a purpose to be explained hereinafter.

The novel method of forming and curing the denture will now be explained. Plastic insert 52 is first placed into lower flask member 20 where it fits snugly as shown in FIG. 3. A holding and solidifying agent 69 is then placed in the enclosure. A commonly used solidifying agent is plaster of paris, and this is mixed and added in fluid pasty form to fill insert 52 as shown in FIG. 3. While plaster 69 is in pasty form a denture mold 70 is placed in the center thereof so that part is depressed into the plaster and the other part which includes the teeth portion 72 projects above the level of edge 60. It should be explained that the denture mold has been previously prepared by a dentist who takes a wax impression of the mouth of the patient. This wax impression forms the denture mold, and the desired plastic or porcelain false teeth 72 are embedded in the wax. The method involved herein is to form an acrylic plastic denture from the wax impression, and the novel apparatus and method disclosed herein provides a remarkably quick and efficient process that produces an improved product over the prior art.

The step of adding the plaster of paris around mold 70 is called investing, and solidifying takes place quickly. The next step is to place insert 54 within upper flask member 22 and place the combined unit over lower flask member 20 which includes the solidified agent 69. In this position edge surface 30 abuts edge surface 28, and the lower ends of lugs 46 slide between the projections 50 on lower flask member 20. In this position the outer surface 62 is flush with edge surface 32. Also in this position it is clear that opening 68 is uppermost and additional solidifying agent 69 can be added in liquid pasty form through opening 68 to fill the enclosure surrounding the upper part of denture mold 70. The agent 69 thereupon solidifies, and top flask member 34 including plug 40 can be placed thereon to complete the combined unit. In placing top flask member 34 atop member 22 the top part of lugs 46 slide between projections 50 on member 34, and alignment of all flask members is assured. Before bringing the upper and lower flask members together, it is desirable to first coat the solidified agent 69 with a lubricating agent such as vaseline. This enables the two flask members to be easily separated later.

Figures 4, 5:
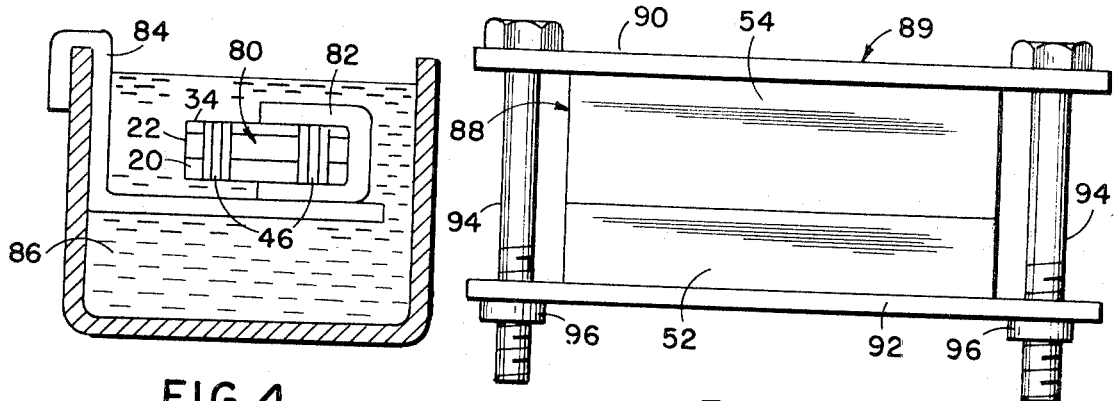
FIG. 4 is a view partly in cross section showing a heating tub for the flask members.
FIG. 5 is a side view showing plastic clamping means for the plastic inserts.

The combined unit with the denture mold 70 surrounded by the solidifying agent is now as shown in FIG. 3, and the next step is to boil out the wax so that it can be replaced by acrylic plastic. For this purpose the combined unit indicated as unit 80 in FIG. 4 is held in a conventional tightenable clamp 82 and placed on a tray 84 that is lowered into a tub or tank 86 of boiling water. The wax thereupon melts and boils out within 1 or 2 minutes leaving an empty space in plaster of paris 69 which is to be filled with the acrylic plastic. In order to make sure that all wax is removed at this time, the unit 80 is taken out from tub 86, unclamped, flask members 20 and 22 separated, and any excess melted wax is then poured off. This leaves the false teeth embedded in the plaster of paris 69 above the empty space where the wax mold had been.

At this time the acrylic plastic is added to the empty space. Unit 80 is in separated form when the acrylic plaster is prepared and added. This is accomplished by mixing a conventional acrylic liquid and powder combination to form a puttylike mixture. This putty mixture is placed in the empty space which exists in the plaster 69 in each insert 52 and 54, and unit 80 is reassembled and placed in a conventional hand press. Pressure is applied by the hand press, such as by using a conventional screw lever until excess acrylic plastic flows out from the unit 80 at the juncture of inserts 52 and 54. It is thereby obvious that the acrylic plastic has then completely filled the space where the wax mold had been.

In the next step the plastic inserts 52 and 54 (which have been pressed together as explained above) are removed as a unit from the metal flask members 20, 22 and 34. This removal is facilitated by tapping plug 40 to loosen the upper flask members 22 and 34. The combined plastic insert unit indicated as unit 88 in FIG. 5 that is removed is therefore understood to be made up of individual inserts 52 and 54 with the acrylic plastic and plaster agent 69 therewithin, and this unit 88 is now placed in a novel clamp 89.

A novel curing step is now provided for the acrylic plastic. It is understood that a curing step of the acrylic plastic denture is necessary for polymerization, and in the prior art this was done by placing the complete metal flask which included the solidifying agent and plastic denture in hot water for a number of hours. In the present invention this is avoided by using the novel plastic inserts 52 and 54 which are held together by the novel clamp 89. By using the novel inserts the denture is separable from the metal flask members, but yet is maintained in alignment by means of clamp 89 which comprises plastic flat slab members 90 and 92. It is important that metal parts forming the unit at this stage of the process be minimized. Accordingly, it will be appreciated that the plastic denture is now positioned within plastic inserts 52 and 54 held in alignment by plastic slabs 90 and 92. The plastic elements 52, 54, 90 and 92 may be formed of a cured acrylic, such as lucite or styrene, which will not distort in boiling water as when inserts 52 and 54 are placed in tub 86. The plastic slabs 90 and 92 tightly hold inserts 52 and 54 by means of a pair of clamping bolts 94 and nuts 96, each positioned on one side, and this is the only metal involved in the unit to be treated.

Figure 6:
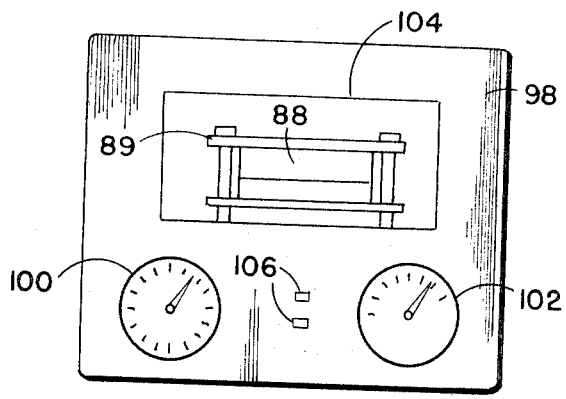
FIG. 6 shows an ultrahigh-frequency oven for curing the plastic denture.

The purpose of minimizing metal and using the novel plastic inserts and plastic clamping slabs is to allow ultrahigh-frequency rays to pass therethrough unhindered. Accordingly, the next step is to place the clamped unit 88 is a microwave or ultrahigh-frequency oven 98 which is shown in FIG. 6 and includes a conventional timer 100 and current indicator 102. Microwave oven 98 is a conventional unit and need only have the requirements of a sufficiently large space 104 to accommodate unit 88 or a plurality of units 88 to be simultaneously cured. The timer would generally require a maximum of 120 to 180 seconds and the current is in the range of 200–400 milliamps. Elements 106 represent the usual on-off and reset switches. The small duration of time that unit 88 spends in oven 98 is the most advantageous feature of the invention. It has been found that satisfactory curing wherein the polymerization is complete and no trace of the monomer remains in the acrylic plastic can be effected in 1 or 2 minutes. This is a tremendous advance over the prior art procedure where hours were required for the hot water curing of dentures, and it is found that the curing by high-frequency rays is more complete in eliminating traces of the monomer.

It is clear from the foregoing that the apparatus and operation thereof has been considerably improved over the prior art. Plastic inserts 52 and 54 are provided to fit into flask members 20 and 22, and it is within these plastic inserts that the denture mold is invested. The wax of the mold is removed by heating and replaced by acrylic plastic, and at this point the metal flask members are removed so that the inserts can be clamped by elements formed substantially of plastic material. The plastic unit thereupon can be treated in a microwave oven so that curing can generally be effected in less than 2 minutes instead of the hours required in the prior art. The invention includes the elimination of the conventional metal flask members during curing and the development of novel plastic inserts and novel clamping means to accelerate acrylic plastic denture production.

The resultant product of the acrylic denture has also been found to be improved over the prior art product cured in hot water. The monomer in the denture produced by the invention is now substantially eliminated as compared with the prior art operation where traces would remain. Such traces would give a toxic effect that irritated some patients wearing these dentures. Further advantages of a completely cured denture by the novel method is that the denture is harder due to the complete polymerization, and the embedded teeth are thereby firmer bound together.

A specific example of a test run with the novel apparatus included inserts and clamping means made of lucite plastic and placed in a microwave oven for curing treatment for 90 seconds at a current of 250 milliamperes. Other test runs showed that highly satisfactory results were obtained for treatments in the range of 80–120 seconds at a current of 200–300 milliamperes. The denture product resulting was found free of the monomer and more durable than the prior art product cured in hot water.

The novel apparatus can also be used in relining a denture. This is a denture that has worn in use or otherwise needed added material to fit comfortably in the mouth of a patient. The dentist makes the desired fit by adding wax to the old denture, and in the practice of the present invention the wax is removed and replaced by acrylic plastic as described hereinbefore so that curing can be completed by the microwave oven disclosed.

The particular embodiment of the invention illustrated and described is to be considered illustrative only. The present invention includes such modifications and equivalents as may readily occur to those skilled in the art, within the scope of the appended claims.

What is claimed is:

1. Apparatus for molding dentures cured in an ultrahigh-frequency oven comprising upper and lower mating flask members adapted to define an enclosed area, said upper flask member including a removable closure element, an upper plastic insert removably positioned in said upper flask member, a lower plastic insert removably positioned in said lower flask member, said positioned inserts aligned in mating relationship to define an enclosed inner area to receive a denture mold therein and in open communication with the area of said closure element for insertion of a solidifying agent to fix said denture mold in place between abutting edges of said inserts, and plastic clamping means to hold said inserts together after removal from said flask members and insertion in said oven.

2. Apparatus according to claim 1, in which each flask member is a shallow cup-shaped section comprising an outer flat wall from whose periphery curved sidewalls extend inwardly, and each insert respectively has a conforming shape to fit closely within the side of each flask member.

3. Apparatus according to claim 2, in which the outer flat wall of the upper plastic unit includes an opening for insertion of the solidifying agent when the inserts are mated together.

4. Apparatus according to claim 2, in which the clamping means comprises a pair of plastic flat members located respectively to abut the outer flat wall of each removed insert, and clamping elements bias said flat members together.

5. Apparatus according to claim 1, in which the flask members are formed of metal having projections thereon, and one flask member includes a lug member extending from between its projections to be slidably positioned within the projections of said other flask member for alignment thereof.